(12) United States Patent
Hida et al.

(10) Patent No.: US 12,249,926 B2
(45) Date of Patent: Mar. 11, 2025

(54) POWER CONVERSION CIRCUIT ENERGIZATION UNIT

(71) Applicant: DENSO CORPORATION, Kariya (JP)

(72) Inventors: Kenshiro Hida, Kariya (JP); Yuuya Kiuchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 421 days.

(21) Appl. No.: 17/669,446

(22) Filed: Feb. 11, 2022

(65) Prior Publication Data

US 2022/0166347 A1 May 26, 2022

Related U.S. Application Data

(63) Continuation of application No. PCT/JP2020/028813, filed on Jul. 28, 2020.

(30) Foreign Application Priority Data

Aug. 27, 2019 (JP) .................................. 2019-154983

(51) Int. Cl.
| | |
|---|---|
| *H02M 7/00* | (2006.01) |
| *H01R 25/16* | (2006.01) |
| *H02M 3/158* | (2006.01) |
| *H02M 7/5387* | (2007.01) |
| *H02P 27/08* | (2006.01) |
| *B60L 53/20* | (2019.01) |

(52) U.S. Cl.
CPC ...... *H02M 7/53871* (2013.01); *H01R 25/162* (2013.01); *H02M 3/158* (2013.01); *H02M 7/003* (2013.01); *H02P 27/08* (2013.01); *B60L 53/20* (2019.02)

(58) Field of Classification Search
CPC .. H02M 7/53871; H02M 3/158; H02M 7/003; H01R 25/162; H02P 27/08; B60L 53/20
USPC .......................................................... 361/637
See application file for complete search history.

(56) References Cited

U.S. PATENT DOCUMENTS

| | | | | |
|---|---|---|---|---|
| 6,377,874 | B1* | 4/2002 | Ykema | H02J 13/00017 |
| | | | | 700/286 |
| 6,822,850 | B2* | 11/2004 | Pfeifer | H05K 7/20927 |
| | | | | 257/E23.098 |
| 8,537,550 | B2* | 9/2013 | Higuchi | H01L 23/473 |
| | | | | 361/699 |
| 2011/0228508 | A1* | 9/2011 | Inuduka | H01G 4/228 |
| | | | | 361/811 |

(Continued)

FOREIGN PATENT DOCUMENTS

| | | |
|---|---|---|
| JP | 2011-109767 A | 6/2011 |
| JP | 2011-114872 A | 6/2011 |
| JP | 2021-035234 A | 3/2021 |

*Primary Examiner* — Anatoly Vortman
(74) *Attorney, Agent, or Firm* — Oliff PLC

(57) ABSTRACT

A power conversion circuit energization unit includes a bus bar module and a conductive fixing bolt. The bus bar module includes conductive P and N bus bars connected to a switch element in a power conversion device and an insulative terminal block on which the bus bars are located. The fixing bolt fixes the terminal block to a housing in which the switch element is housed. A head of the fixing bolt and the P bus bar are separated from each other in an axial direction along which a shaft of the fixing bolt extends while facing each other.

18 Claims, 11 Drawing Sheets

(56) References Cited

U.S. PATENT DOCUMENTS

| | | | |
|---|---|---|---|
| 2011/0280056 A1* | 11/2011 | Noda | H05K 7/14329 363/146 |
| 2012/0236500 A1* | 9/2012 | Higuchi | H01L 23/473 361/699 |
| 2012/0300521 A1* | 11/2012 | Hida | H05K 7/14329 363/131 |
| 2013/0028001 A1* | 1/2013 | Yokota | H02M 7/003 363/144 |
| 2014/0092663 A1* | 4/2014 | Shimizu | H05K 7/20254 363/141 |
| 2014/0118909 A1* | 5/2014 | Matsuno | H02M 7/003 361/679.01 |
| 2015/0173238 A1* | 6/2015 | Nakanishi | H05K 7/14329 29/830 |
| 2015/0256096 A1 | 9/2015 | Nishizawa et al. | |
| 2015/0371937 A1* | 12/2015 | Yoshihara | H01L 24/37 361/761 |
| 2018/0026545 A1* | 1/2018 | Numakura | H05K 7/2089 361/689 |
| 2018/0358903 A1 | 12/2018 | Takahashi et al. | |
| 2019/0174647 A1* | 6/2019 | Umeda | B60L 50/51 |
| 2022/0166347 A1* | 5/2022 | Hida | H02M 3/158 |

\* cited by examiner

POWER CONVERSION CIRCUIT ENERGIZATION UNIT

CROSS REFERENCE TO RELATED APPLICATION

The present application is a continuation application of International Patent Application No. PCT/JP2020/028813 filed on Jul. 28, 2020, which designated the U.S. and claims the benefit of priority from Japanese Patent Application No. 2019-154983 filed on Aug. 27, 2019. The entire disclosures of all of the above applications are incorporated herein by reference.

TECHNICAL FIELD

The present disclosure relates to a power supply unit for a power circuit.

BACKGROUND

Conventionally, a power conversion device including a semiconductor module is known.

SUMMARY

According to an aspect of the present disclosure, a power conversion circuit energization unit includes a bus bar module. The bus bar module has a bus bar and a fixing bolt.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
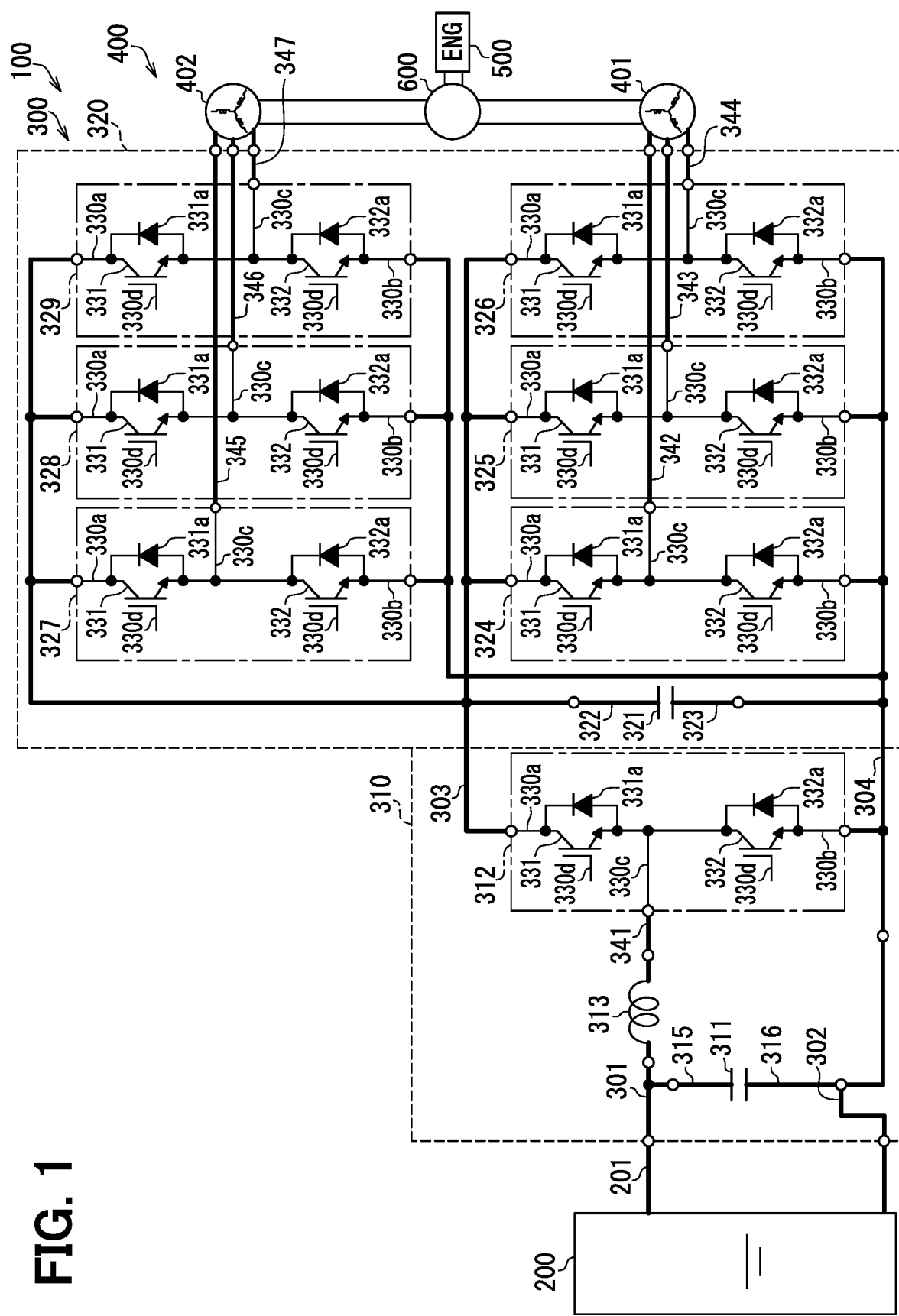
FIG. 1 is a circuit diagram of an in-vehicle system.

Hereinafter, examples of the present disclosure will be described.

According to an example of the present disclosure, a power conversion device includes a semiconductor module, a direct current (DC) bus bar, a fixed base, and a case. A DC bus bar is connected to the semiconductor module. The DC bus bar is fixed to the case via a fixing base.

In this example, an electric current flows through the DC bus bar due to a control of the semiconductor module. When the electric current changes with time, a surge voltage corresponding to an inductance component of the DC bus bar may occur. The surge voltage may cause a failure in the semiconductor module.

According to an example of the present disclosure, a power conversion circuit energization unit comprises a bus bar module and a fixing bolt. The bus bar module includes a bus bar that is conductive and connected to a switch element, which is included in a power conversion device, and an insulative terminal block on which the bus bar is mounted. The fixing bolt is conductive and fixes the terminal block to a housing in which the switch element is housed. A head of the fixing bolt and the bus bar face each other and are separated from each other in an axial direction along which a shaft of the fixing bolt extends.

In the present configuration, the bus bar and the head of the fixing bolt face each other in the axial direction. Therefore, a magnetic field generated by the electric current flowing through the bus bars easily passes through the fixing bolt. That is, an eddy current easily flows through the fixing bolt.

In such manner, it makes energy of the electric current difficult to be stored/accumulated in the inductance component of the bus bars. The inductance component of the bus bar appears to be reduced effectively. As a result, it prevents or suppresses an increase in a surge voltage caused by a time change of the electric current flowing through the bus bars.

Hereinafter, embodiments are described with reference to the drawings.

First Embodiment

<In-Vehicle System>

First, an in-vehicle system 100 to which a bus bar module 700 is applied is described with reference to FIG. 1. The in-vehicle system 100 constitutes a hybrid system.

The in-vehicle system 100 includes a battery 200, a power conversion device 300, and a motor 400. The in-vehicle system 100 has an engine 500 and a power distribution mechanism 600. The power conversion device 300 includes the bus bar module 700. The motor 400 has a first MG 401 and a second MG 402. MG is an abbreviation for a motor generator.

Further, the in-vehicle system 100 has a plurality of ECUs. These ECUs transmit and receive signals to and from each other via bus wiring. The plurality of ECUs control a hybrid vehicle in cooperation. By the cooperative control of the plurality of ECUs, power running and power generation (i.e., regeneration) of the motor 400 according to an SOC of the battery 200, output of the engine 500, and the like are controlled. SOC is an abbreviation for state of charge. ECU is an abbreviation for electronic control unit.

The ECU has at least one arithmetic processing unit (CPU) and at least one memory device (MMR) as a storage medium for storing programs and data. The ECU includes a microcontroller/microcomputer including a computer-readable storage medium. The storage medium is a non-transitory, tangible storage medium that non-temporally stores a computer readable program. The storage medium may include a semiconductor memory, a magnetic disk, or the like. Hereinafter, components of the in-vehicle system 100 are individually outlined.

The battery 200 has a plurality of secondary batteries. These plurality of secondary batteries form a battery stack connected in series. As the secondary battery, a lithium ion secondary battery, a nickel hydride secondary battery, an organic radical battery, or the like can be used.

The secondary battery generates an electromotive voltage by a chemical reaction. The secondary battery has a property that deterioration is promoted when the charge amount is too large or small. In other words, the secondary battery has, in nature, an accelerated deterioration of its performance when the SOC is overcharged or overdischarged.

The SOC of the battery 200 corresponds to the SOC of the battery stack described above. The SOC of the battery stack is a sum of the SOCs of a plurality of secondary batteries. Overcharging and overdischarging of the SOC of the battery stack are avoidable by the above-described cooperative control. On the other hand, overcharging and overdischarging of the SOC of each of the plurality of secondary batteries are avoidable by an equalization processing for equalizing the SOC of each of the plurality of secondary batteries.

The equalization process is performed by individually charging and discharging each of the plurality of secondary batteries. The battery 200 is provided with a monitoring unit including a switch for individually charging and discharging each of the plurality of secondary batteries. Further, the battery 200 is provided with a current sensor, a temperature sensor, and the like for detecting the SOC of each of the plurality of secondary batteries. One battery ECU of the plurality of ECUs controls opening and closing of the switch based on the output of these sensors and the like. In such manner, the SOC of each of the plurality of secondary batteries is equalized. Note that voltage detection described later is also used for detecting the SOC.

The power conversion device 300 performs power conversion between the battery 200 and the first MG 401. The power conversion device 300 also performs power conversion between the battery 200 and the second MG 402. The power conversion device 300 converts the DC power of the battery 200 into an AC power at a voltage level suitable for power running of the first MG 401 and the second MG 402. The power conversion device 300 converts the AC power generated by the power generation of the first MG 401 and the second MG 402 into DC power having a voltage level suitable for charging the battery 200. The power conversion device 300 is described later in detail.

Each of the first MG 401, the second MG 402, and the engine 500 is connected to power distribution mechanism 600. The first MG 401 generates electric power using rotational energy supplied from the engine 500. The AC power generated by this power generation is converted into the DC power by the power conversion device 300 and the voltage of the DC power is lowered. This DC power is supplied to the battery 200. The DC power is also supplied to various electric loads mounted on the hybrid vehicle.

The second MG 402 is connected an output shaft of the hybrid vehicle. The rotational energy of the second MG 402 is transmitted to the traveling wheels via the output shaft. Conversely, the rotational energy of the traveling wheels is transmitted to the second MG 402 via the output shaft.

The power running of the second MG 402 is performed by the AC power supplied from the power conversion device 300. The rotational energy generated by this power running is distributed by the power distribution mechanism 600 to the engine 500 and the traveling wheels. As a result, cranking of the crankshaft and application of propulsion to the traveling wheels are performed. Further, the second MG 402 regenerates by rotational energy transmitted from the traveling wheels. The AC power generated by this regeneration is converted into the DC power by the power conversion device 300 and the voltage of the DC power is lowered. This DC power is supplied to the battery 200 and various electric loads.

The engine 500 generates rotational energy by a drive of internal combustion. This rotational energy is distributed to the first MG 401 and the second MG 402 via the power distribution mechanism 600. As a result, the power generation of the first MG 401 and the application of the propulsion to the traveling wheels are performed.

The power distribution mechanism 600 has a planetary gear mechanism. The power distribution mechanism 600 has a sun gear, a planetary gear, a planetary carrier, and a ring gear.

The sun gear and the planetary gear each have a disk shape. A plurality of teeth are formed on a circumferential surface of each of the sun gear and the planetary gear in a circumferential direction.

The planetary carrier forms a ring. A plurality of planetary gears are connected to a flat surface of the planetary carrier such that the flat surfaces of the planetary carrier and the planetary gear face each other.

The plurality of planetary gears are positioned on a circumference centered on a rotation center of the planetary carrier. Intervals of the plurality of planetary gears are equal. In the present embodiment, three planetary gears are arranged at intervals of 120°.

The ring gear has an annular shape. A plurality of teeth are formed on the outer peripheral surface and the inner peripheral surface of the ring gear in a circumferential direction.

The sun gear is provided at the center of the ring gear. The outer peripheral surface of the sun gear and the inner peripheral surface of the ring gear face each other. Three planetary gears are provided between the two. The teeth of each of the three planetary gears engage with the teeth of each of the sun gear and the ring gear. Thus, the rotations of the sun gear, the planetary gear, the planetary carrier, and the ring gear can be transmitted to each other.

A motor shaft of the first MG 401 is connected to the sun gear. A crankshaft of the engine 500 is connected to the planetary carrier. A motor shaft of the second MG 402 is connected to the ring gear. Thus, the rotation speeds of the first MG 401, the engine 500, and the second MG 402 have a linear relationship in a collinear chart.

When the AC power is supplied from the power conversion device 300 to the first MG 401 and the second MG 402, torque is generated in the sun gear and the ring gear. The combustion drive of the engine 500 generates torque in the planetary carrier. In such manner, the power generation of the first MG 401 as well as the power running and regeneration, and the provision of propulsion force to the traveling wheels of the second MG 402 are respectively performed.

For example, an MGECU among the plurality of ECUs described above is configured to determine a target torque of each of the first MG 401 and the second MG 402 based on physical quantities detected by various sensors mounted on the hybrid vehicle and vehicle information input from other ECUs. The MGECU performs vector control so that the torque generated in each of the first MG 401 and the second MG 402 becomes the target torque.

<Circuit Configuration of Power Conversion Device>

The power conversion device 300 is described. As shown in FIG. 1, the power conversion device 300 includes a converter 310 and an inverter 320 as components of a power conversion circuit. The converter 310 performs a function of raising and lowering the voltage level of DC power. The inverter 320 performs a function of converting DC power to AC power. The inverter 320 performs a function of converting AC power to DC power.

The converter 310 raises/boosts DC power of the battery 200 to a voltage level suitable for generating torque by the first MG 401 and the second MG 402. The inverter 320 converts this DC power into AC power. This AC power is supplied to the first MG 401 and the second MG 402. The inverter 320 converts the AC power generated by the first MG 401 and the second MG 402 into DC power. The converter 310 lowers the DC power to a voltage level suitable for charging the battery 200.

As shown in FIG. 1, a wire harness 201 is connected to the battery 200. A positive bus bar 301 is electrically connected to a positive electrode of the battery 200 via the wire harness 201. A negative bus bar 302 is electrically connected to a negative electrode of the battery 200 via the wire harness 201.

The converter 310 is electrically connected to the battery 200 via the positive bus bar 301, the negative bus bar 302, and the wire harness 201. The converter 310 is electrically connected to the inverter 320 via a P bus bar 303 and an N bus bar 304.

<Converter>

The converter 310 has a filter capacitor 311, an A-phase switch module 312, and an A-phase reactor 313 as electric elements.

As shown in FIG. 1, a first electrode bus bar 315 is connected to one of two electrodes of the filter capacitor 311. A second electrode bus bar 316 is connected to the remaining one of the two electrodes. The positive bus bar 301 is connected to the first electrode bus bar 315. The negative bus bar 302 is connected to the second electrode bus bar 316. Thereby, the battery 200 and the filter capacitor 311 are electrically connected.

One end of the A-phase reactor 313 is connected to the positive bus bar 301. The other end of the A-phase reactor 313 is connected to the A-phase switch module 312 via a first connection bus bar 341. The N bus bar 304 is connected to the second electrode bus bar 316. The A-phase switch module 312 is connected to the N bus bar 304. Thus, the battery 200 and the A-phase switch module 312 are electrically connected via the A-phase reactor 313. In FIG. 1, the connection parts of various bus bars are indicated by white circles. These connection parts are electrically connected by, for example, bolts or welding.

The A-phase switch module 312 has a high-side switch 331 and the low-side switch 332. The A-phase switch module 312 has a high-side diode 331*a* and a low-side diode 332*a*. These semiconductor elements are covered and protected by a sealing resin (not shown).

In the present embodiment, an n-channel IGBT is employed as the high-side switch 331 and the low-side switch 332. Ends of terminals respectively connected to a collector electrode, an emitter electrode, and a gate electrode of the high-side switch 331 and the low-side switch 332 are exposed from the sealing resin.

As shown in FIG. 1, the emitter electrode of the high-side switch 331 and the collector electrode of the low-side switch 332 are connected. Thus, the high-side switch 331 and the low-side switch 332 are connected in series.

A cathode electrode of the high-side diode 331*a* is connected to the collector electrode of the high-side switch 331. An anode electrode of the high-side diode 331*a* is connected to the emitter electrode of the high-side switch 331. Thus, the high-side diode 331*a* is connected in anti-parallel to the high-side switch 331.

Similarly, the cathode electrode of the low-side diode 332*a* is connected to the collector electrode of the low-side switch 332. The anode electrode of the low-side diode 332*a* is connected to the emitter electrode of the low-side switch 332. Thus, the low-side diode 332*a* is connected in anti-parallel to the low-side switch 332.

As described above, the high-side switch 331 and the low-side switch 332 are covered and protected by the sealing resin. Ends of terminals are exposed rom this sealing resin, i.e., an end of the terminal connected to the collector electrode and the gate electrode of the high-side switch 331, an end of the terminal connected to a midpoint between the high-side switch 331 and the low-side switch 332, and an end of the terminal connected to the emitter electrode and the gate electrode of the low-side switch 332 are respectively exposed. Hereinafter, these terminals are referred to as a collector terminal 330*a*, a midpoint terminal 330*c*, an emitter terminal 330*b*, and a gate terminal 330*d*.

The collector terminal 330*a* is connected to the P bus bar 303. The emitter terminal 330*b* is connected to the N bus bar 304. Thus, the high-side switch 331 and the low-side switch 332 are connected in series from the P bus bar 303 to the N bus bar 304 in order.

The midpoint terminal 330*c* is connected to the first connection bus bar 341. The first connection bus bar 341 is electrically connected to the positive electrode of the battery 200 via the A-phase reactor 313 and the positive bus bar 301.

As described above, the DC power of the battery 200 is supplied to the midpoint of the two switches included in the A-phase switch module 312 via the positive bus bar 301, the A-phase reactor 313, and the first connection bus bar 341. The AC power of the motor 400 converted to DC power by the inverter 320 is supplied to the collector electrode of the high-side switch 331 of the A-phase switch module 312.

A gate driver is connected to each of the gate terminals 330*d* of the high-side switch 331 and the low-side switch 332. The MGECU generates a control signal, and outputs it to the gate driver. The gate driver amplifies the control signal, and outputs it to the gate terminal 330*d*. Thus, the high-side switch 331 and the low-side switch 332 are controlled to open and close by the MGECU. As a result, the voltage level of the DC power input to the converter 310 is stepped up and down (i.e., raised and lowered).

The MGECU generates a pulse signal as a control signal. The MG ECU adjusts the level of the DC power by adjusting an on-duty ratio and a frequency of the pulse signal for raising/lowering the voltage. This raised/lowered level of the voltage is determined according to the target torque of the motor 400 and the SOC of the battery 200.

When raising the voltage of the DC power of the battery 200, the MGECU alternately opens and closes each of the high-side switch 331 and the low-side switch 332. Conversely, when lowering the voltage of the DC power supplied from the inverter 320, the MGECU fixedly outputs the control signal in a low level to the low-side switch 332. At the same time, the MGECU sequentially switches the control signal output to the high-side switch 331 between a high level and a low level.

<Inverter>

The inverter 320 has a smoothing capacitor 321, a discharge resistor (not shown), and U-phase switch modules 324 to 329 as electric elements.

A third electrode bus bar 322 is connected to one of the two electrodes of the smoothing capacitor 321. A fourth electrode bus bar 323 is connected to the remaining one of the two electrodes. The P bus bar 303 is connected to the third electrode bus bar 322. The N bus bar 304 is connected to the fourth electrode bus bar 323.

The discharge resistor is also connected to the P bus bar 303 and the N bus bar 304. The U-phase switch module 324 to a Z-phase switch module 329 are also connected to the P bus bar 303 and the N bus bar 304. Each of the smoothing capacitor 321, the discharge resistor, and the U-phase switch module 324 to the Z-phase switch module 329 is connected in parallel to positions between the P bus bar 303 and the N bus bar 304.

Each of the U-phase switch module 324 to the Z-phase switch module 329 has components equivalent to the A-phase switch module 312. That is, each of the U-phase switch module 324 to the Z-phase switch module 329 has the high-side switch 331, a low-side switch 332, the high-side diode 331a, the low-side diode 332a, and a sealing resin. Each of these six phase switch modules has the collector terminal 330a, the emitter terminal 330b, the midpoint terminal 330c, and the gate terminal 330d. The high-side switch 331 and the low-side switch 332 correspond to switch elements.

The collector terminal 330a of each of these six phase switch modules is connected to the P bus bar 303. The emitter terminal 330b is connected to the N bus bar 304.

The midpoint terminal 330c of the U-phase switch module 324 is connected to a U-phase stator coil of the first MG 401 via a second connection bus bar 342. The midpoint terminal 330c of a V-phase switch module 325 is connected to a V-phase stator coil of the first MG 401 via a third connection bus bar 343. The midpoint terminal 330c of a W-phase switch module 326 is connected to a W-phase stator coil of the first MG 401 via a fourth connection bus bar 344.

Similarly, the midpoint terminal 330c of a X-phase switch module 327 is connected to an X-phase stator coil of the second MG 402 via a fifth connection bus bar 345. The midpoint terminal 330c of a Y-phase switch module 328 is connected to a Y-phase stator coil of the second MG 402 via a sixth connection bus bar 346. The midpoint terminal 330c of the Z-phase switch module 329 is connected to a Z-phase stator coil of the second MG 402 via a seventh connection bus bar 347.

The gate terminals 330d of these six phase switch modules are respectively connected to the gate driver described above. When power running of each of the first MG 401 and the second MG 402 is performed, each of the high-side switch 331 and the low-side switch 332 included in the six phase switch modules is PWM-controlled by the output of a control signal from the MGECU. Thereby, three-phase alternating current is generated by the inverter 320. When each of the first MG 401 and the second MG 402 generates (i.e., regenerates) electric power, the MGECU stops outputting the control signal, for example. In such manner, the AC power generated by the power generation passes through the diodes of the six phase switch modules. As a result, AC power is converted to DC power.

The types of switch elements included in each of the A-phase switch module 312 and the U-phase switch module 324 to the Z-phase switch module 329 are not particularly limited, and for example, MOSFETs can be employed. Semiconductor elements such as switches and diodes included in these switch modules can be manufactured using semiconductors such as Si (i.e., silicon) and wide gap semiconductors such as SiC (i.e., Silicon Carbide). The constituent material of the semiconductor element is not particularly limited.

Further, an example has been shown in which each of the A-phase switch module 312 and the U-phase switch modules 324 to the Z-phase switch module 329 has one high-side switch 331 and one low-side switch 332. However, these phase switch modules may include a high-side switch module having a plurality of high-side switches 331 covered with a sealing resin and a low-side switch module having a plurality of low-side switches 332 covered with a sealing resin.

In such a configuration, the plurality of high-side switches 331 included in the high-side switch module and the plurality of low-side switches 332 included in the low-side switch module are respectively connected in series at positions between the P bus bar 303 and the N bus bar 304. The plurality of series-connected high-side switches 331 and low-side switches 332 are connected in parallel at positions between the P bus bar 303 and the N bus bar 304.

<Mechanical Configuration of Power Conversion Device>

Figure 2:
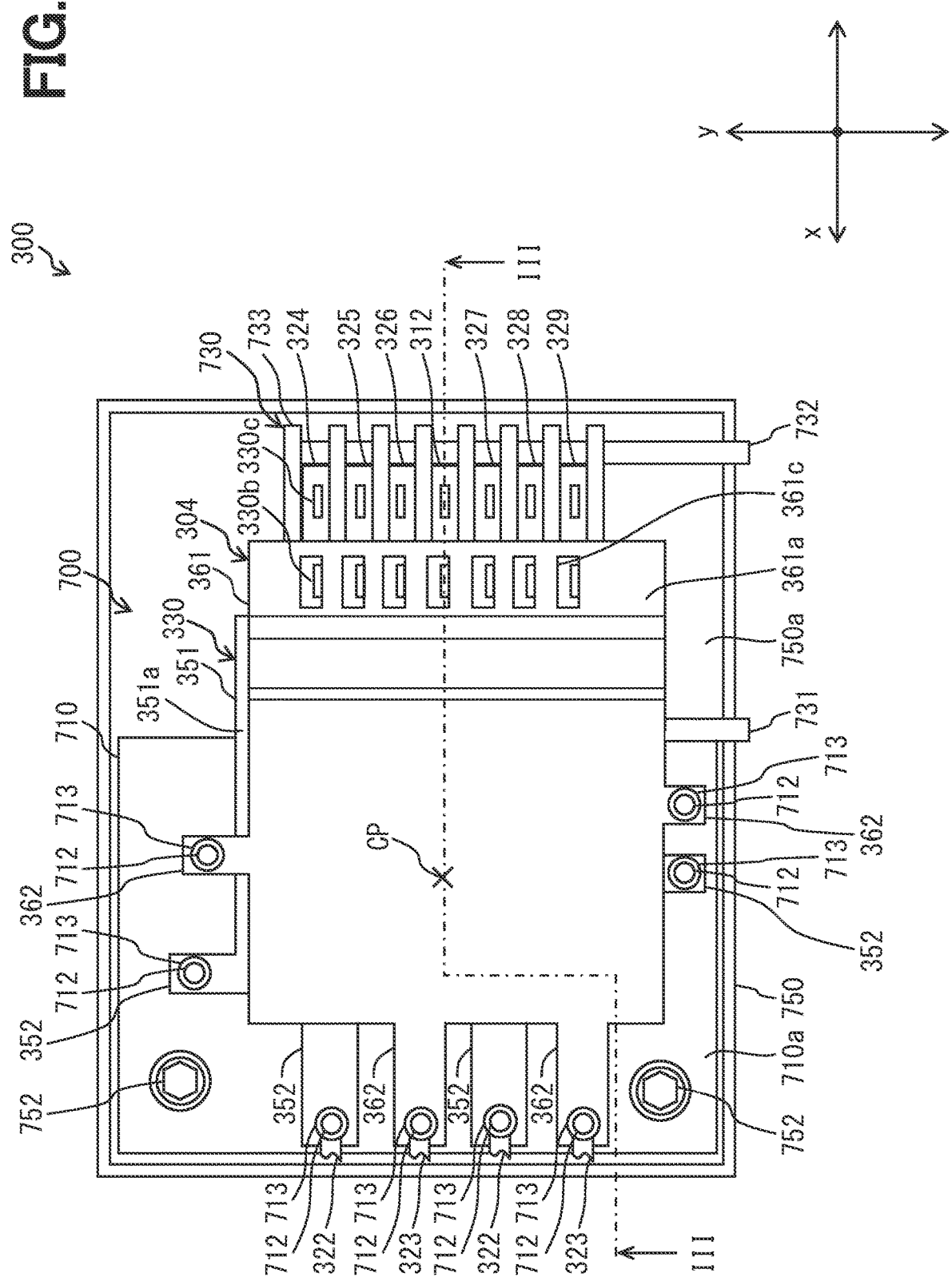
FIG. 2 is a top view of a power conversion device.

The power conversion device 300 includes the bus bar module 700, a cooler 730, and a housing 750 illustrated in FIG. 2 in addition to the components of the power conversion circuit described above.

The bus bar module 700 includes the P bus bar 303 and the N bus bar 304 described above. In addition, the bus bar module 700 includes a terminal block 710 and an insulative paper 720 indicated by a broken line in FIG. 10. The bus bar module 700 is described later in detail.

The cooler 730 houses the phase switch modules included in the converter 310 and the inverter 320. The cooler 730 has a function of cooling these plurality of phase switch modules.

As shown in FIG. 2, the cooler 730 has a supply pipe 731, a discharge pipe 732, and a plurality of relay pipes 733. The supply pipe 731 and the discharge pipe 732 are connected via the plurality of relay pipes 733. A refrigerant is supplied to the supply pipe 731. The refrigerant flows from the supply pipe 731 to the discharge pipe 732 via the plurality of relay pipes 733.

The supply pipe 731 and the discharge pipe 732 each extend in the y direction. The supply pipe 731 and the discharge pipe 732 are separated with a distance in the x direction. Each of the plurality of relay pipes 733 extends along the x direction from the supply pipe 731 to the discharge pipe 732.

The plurality of relay pipes 733 are spaced apart with a distance in the y direction. Two adjacent relay pipes 733 are separated by a void. The cooler 730 has a total of seven voids. In each of these seven voids, seven phase switch modules are provided one by one.

A main surface of each of these seven phase switch modules is in contact with the relay pipe 733. The contact area size between the module and the relay pipe is increased by a biasing force applied from a spring body (not shown). Thus, heat generated in each of the seven phase switch modules can be radiated to the refrigerant via the relay pipe 733.

Figure 3:
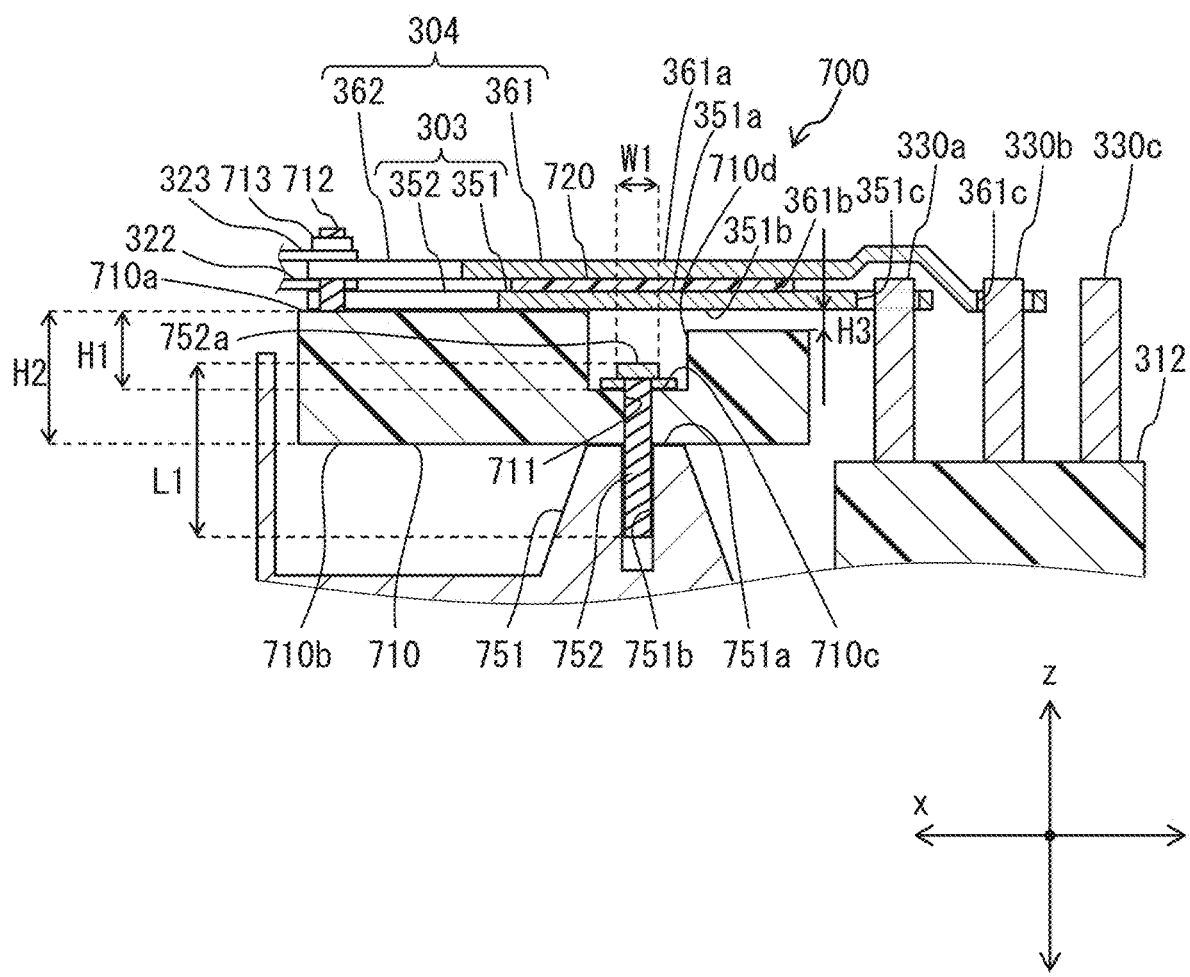
FIG. 3 is a cross-sectional view taken along a line III-III shown in FIG. 2.

In such manner as described above, the collector terminal 330a, the emitter terminal 330b, and the midpoint terminal 330c of each of the seven phase switch modules are arranged or lined up along the x direction from the supply pipe 731 to the discharge pipe 732 at positions in the voids of the cooler 730, as shown in FIGS. 2 and 3. These three terminals respectively extend away from the sealing resin of the phase switch module in the z direction.

The housing 750 is manufactured by, for example, aluminum die casting. The housing 750 houses various other components included in the power conversion device 300 described above. These stored items are fixed to the housing 750 by fixing members such as bolts and spring bodies.

As shown in FIG. 3, a support portion 751 extending in the z direction from an inner bottom surface 750a is formed in the housing 750. The collector terminal 330a among the three terminals included in the phase switch module is positioned closest to the support portion 751 in the x direction.

A support surface 751a on a tip end side of the support portion 751 has a flat shape facing the z direction. The bus bar module 700 is mounted on the support surface 751a.

A fixing bolt hole 751b having a screw groove is formed in the support portion 751. The fixing bolt hole 751b has an opening in the support surface 751a. A tip end side of a shaft of a fixing bolt 752 is fastened to the screw groove of the fixing bolt hole 751b. The bus bar module 700 is fixed to the housing 750 by the fixing bolt 752.

The power conversion device 300 also has the following components not shown in the drawing. That is, the power conversion device 300 has (i) a resin mold in which the positive bus bar 301 and the negative bus bar 302 are formed by insert molding, and (ii) a capacitor case in which the filter capacitor 311 and the smoothing capacitor 321 are housed. Further, the power conversion device 300 includes (i) a reactor case in which the A-phase reactor 313 is housed, (ii) a terminal portion in which the first to seventh connection bus bars 341 to 347 are insert-molded, and (iii) a control circuit board with the MGECU mounted thereon as well as a driver board with a driver.

A part of each of the third electrode bus bar 322 and the fourth electrode bus bar 323 is housed in the above-mentioned capacitor case, and a part of the each of the bus bars 322 and 323 is exposed therefrom. The exposed parts of the third electrode bus bar 322 and the fourth electrode bus bar 323 exposed from the capacitor case are mechanically connected to the terminal block 710 of the bus bar module 700. At the same time, the third electrode bus bar 322 is electrically connected to the P bus bar 303. The fourth electrode bus bar 323 is electrically connected to the N bus bar 304.

<Bus Bar Module>

Next, the bus bar module 700 is described in detail. In this regard, hereinafter, three directions that are orthogonal/perpendicular to each other is referred to as x, y, and z directions.

As described above, the bus bar module 700 includes the P bus bar 303 and the N bus bar 304. Each of the P bus bar 303 and the N bus bar 304 is made of a metal material such as copper, aluminum or the like. These two bus bars are manufactured by pressing a flat metal plate.

The bus bar module 700 has the terminal block 710 and the insulative paper 720. The terminal block 710 is made of an insulative resin material. The terminal block 710 has a function of fixing the P bus bar 303 and the N bus bar 304 to the housing 750. The insulative paper 720 is made of an insulative material. The insulative paper 720 functions to insulate the P bus bar 303 and the N bus bar 304.

Figure 7:
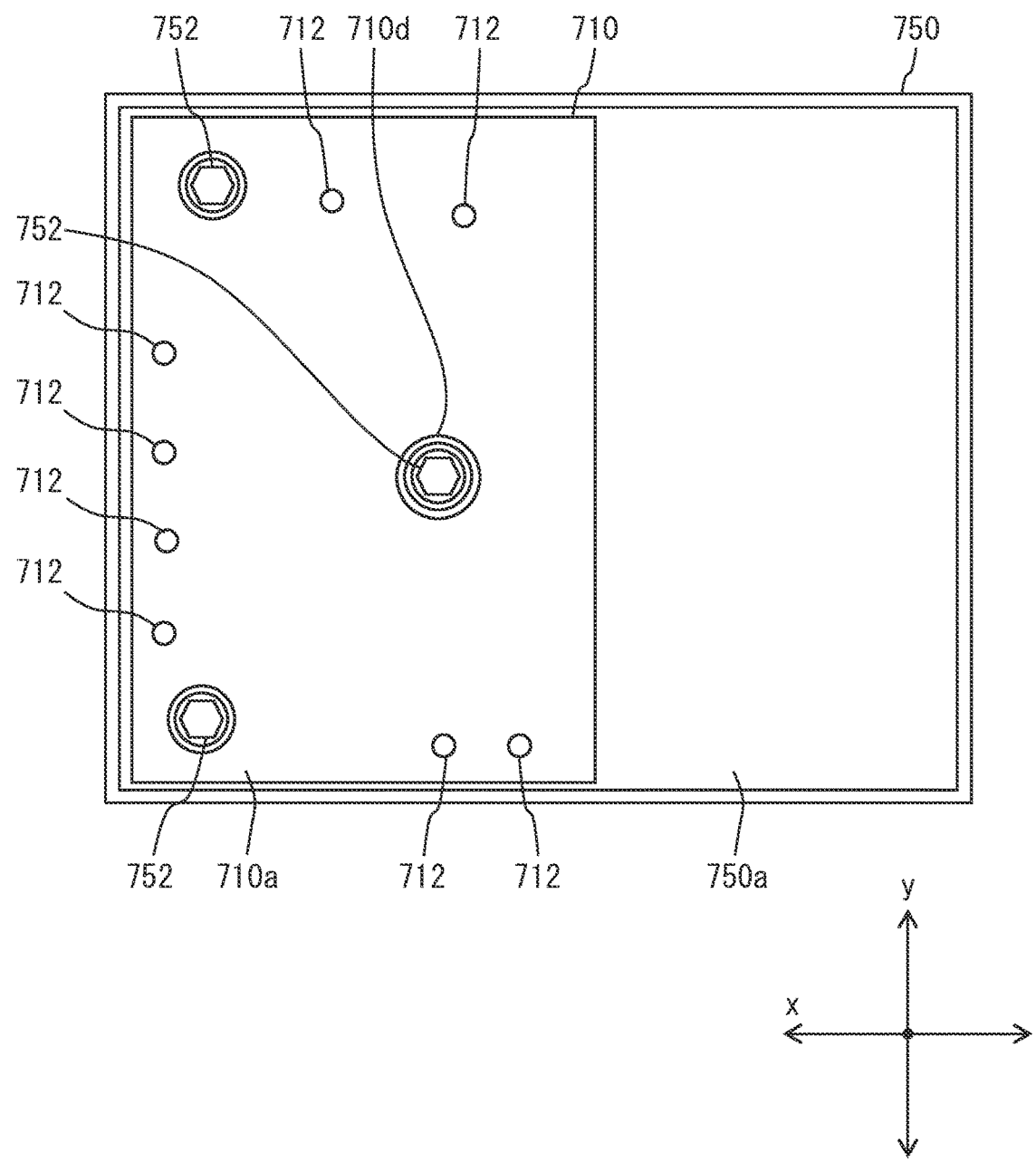
FIG. 7 is a top view showing a state where the terminal block is fixed to the housing.
Figure 8:
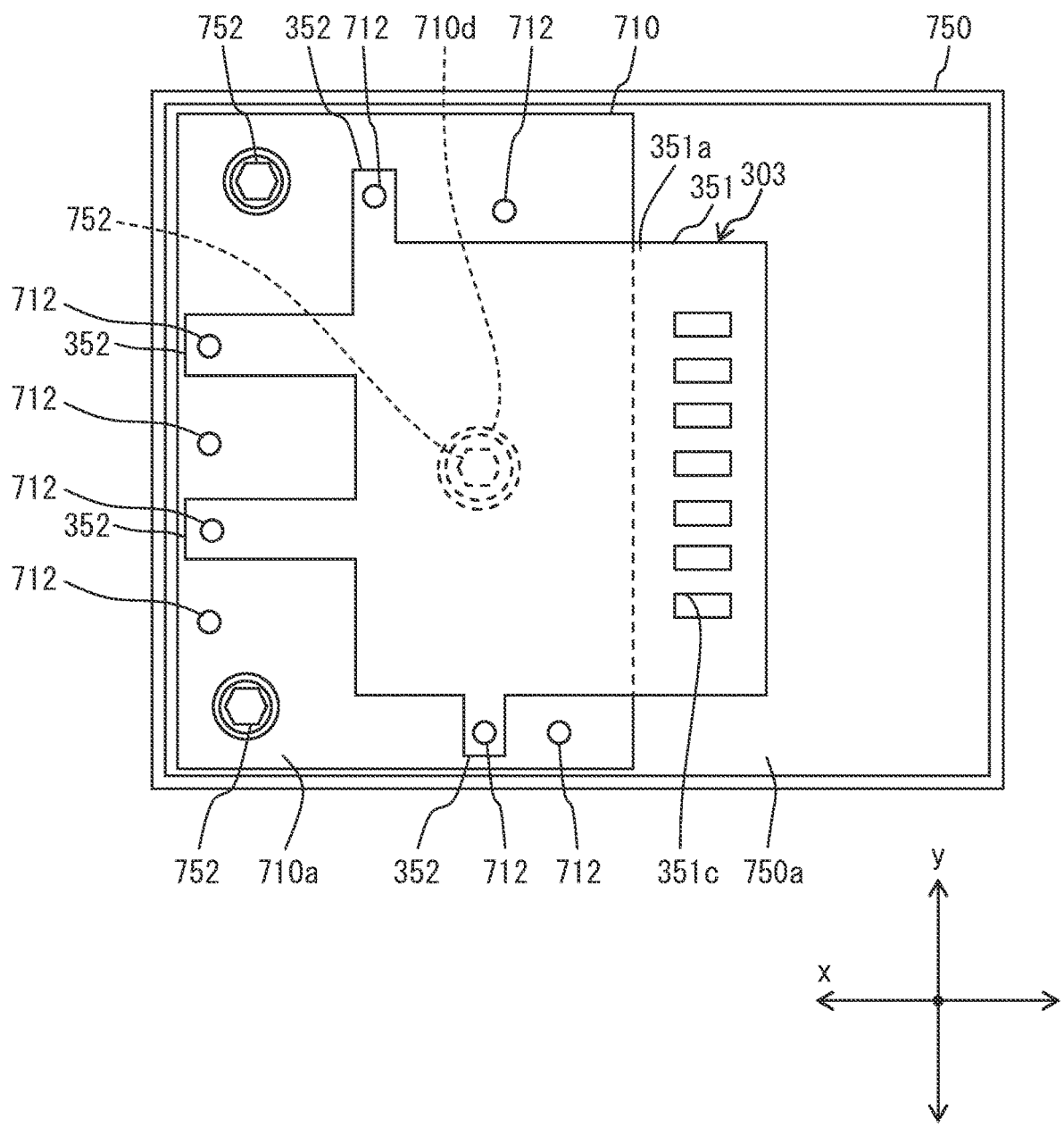
FIG. 8 is a top view showing a state where the P bus bar is mounted on the terminal block.
Figure 9:
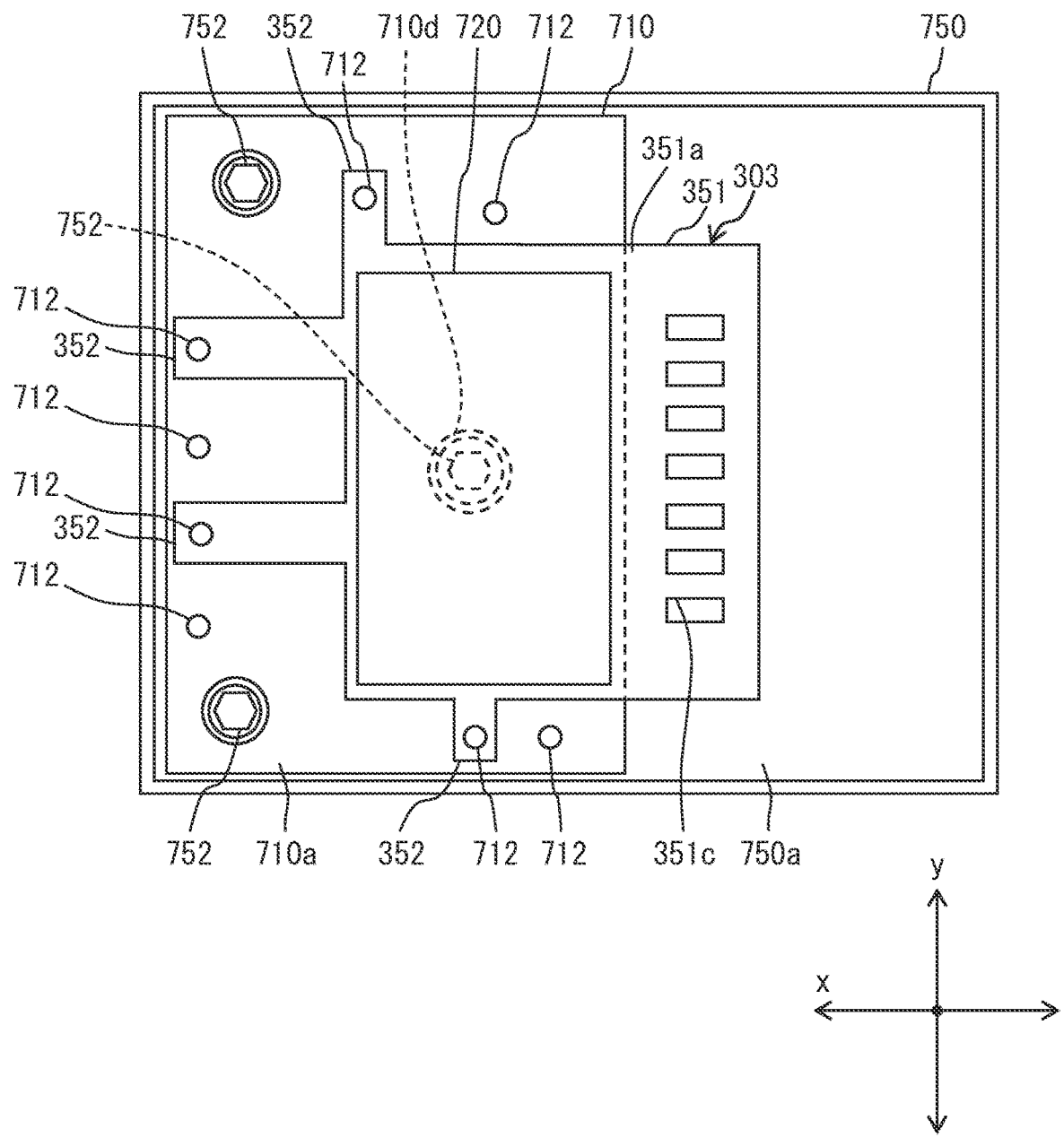
FIG. 9 is a top view showing a state where insulative paper is mounted on the P bus bar.
Figure 10:
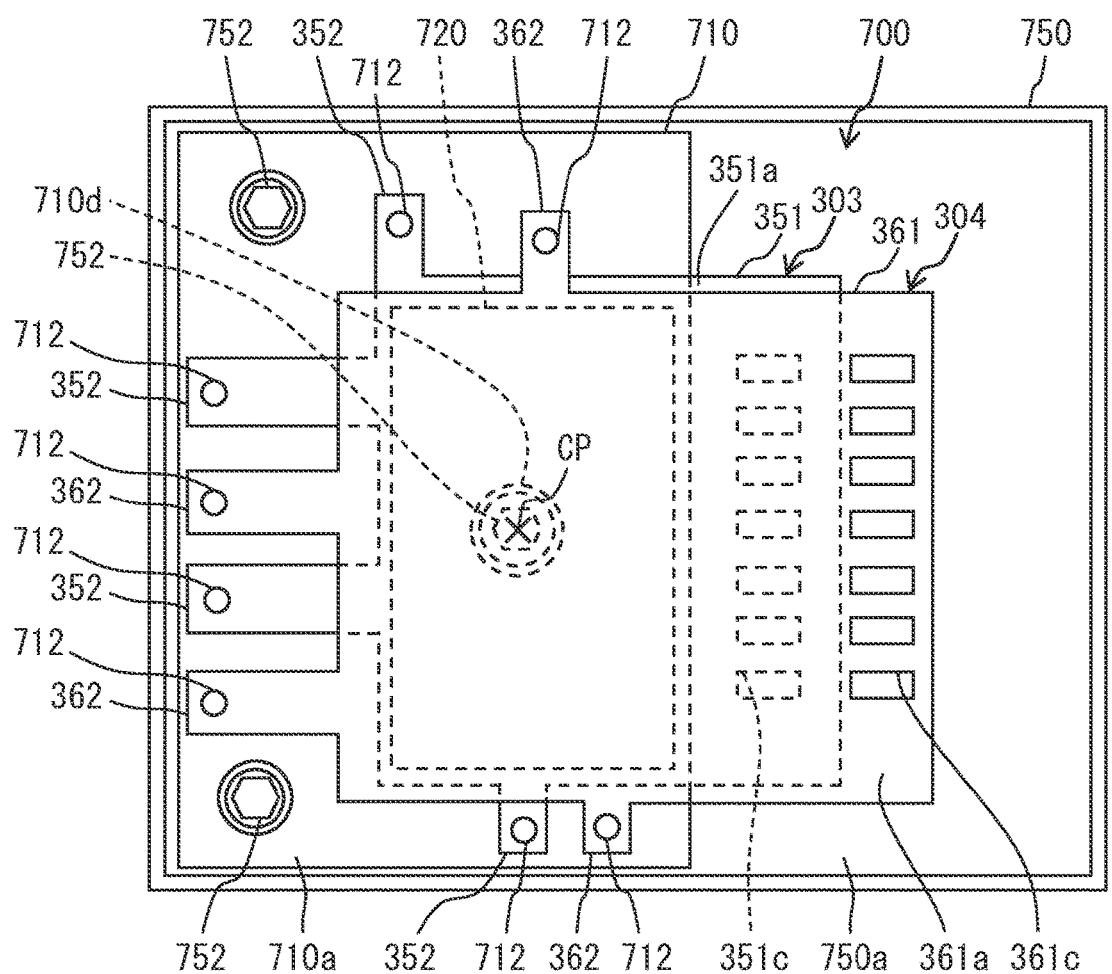
FIG. 10 is a top view showing a state in which he N bus bar is mounted on the P bus bar via the insulative paper.

As shown in FIG. 7, the terminal block 710 is fixed to the housing 750 by fixing bolts 752. As shown in FIG. 8, the P bus bar 303 is located on the terminal block 710. As shown in FIG. 9, the insulative paper 720 is located on the P bus bar 303. As shown in FIG. 10, the N bus bar 304 is located on the P bus bar 303 with the insulative paper 720 interposed therebetween. The third electrode bus bar 322 is connected to the P bus bar 303 and is fixed to the terminal block 710. The fourth electrode bus bar 323 is connected to the N bus bar 304 and is fixed to the terminal block 710. The bus bar module 700 and the fixing bolts 752 described later are included in a power conversion circuit energization unit. Hereinafter, the components of the bus bar module 700 is described individually.

<P Bus Bar>

Figure 4:
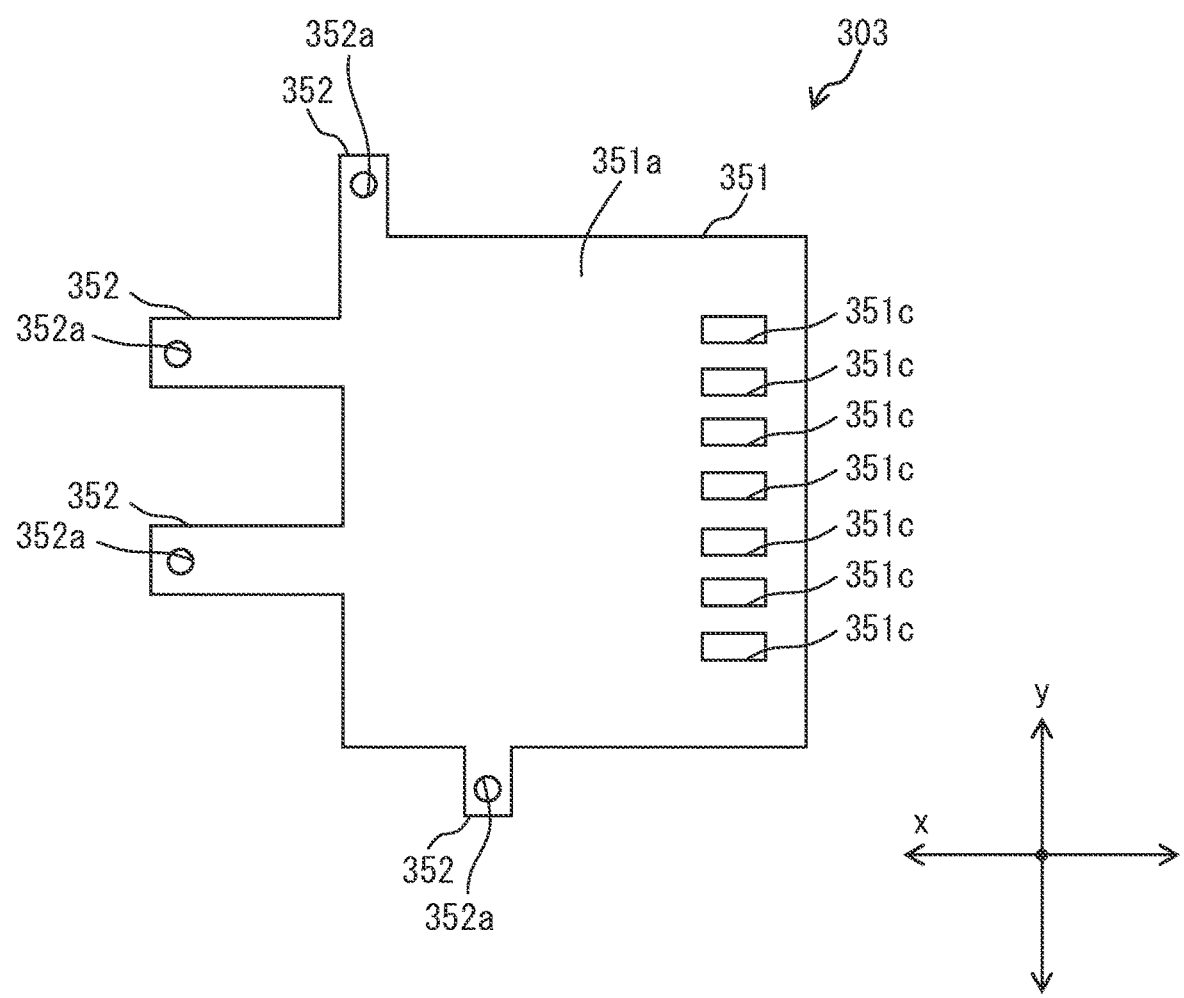
FIG. 4 is a top view of a P bus bar.

As shown in FIG. 4, the P bus bar 303 has a flat plate shape with a small thickness in the z direction. To be more specific, the P bus bar 303 has a first flat plate portion 351 and a first extension portion 352.

The first flat plate portion 351 is larger in size than the first extension portion 352. The center of gravity of the P bus bar 303 is positioned in the first flat plate portion 351. More precisely, the center of gravity of the P bus bar 303 is positioned in part of the first flat plate portion 351 that is aligned with the terminal block 710 in the z direction.

The first flat plate portion 351 has a first left edge portion and a first right edge portion separately arranged in a row in the x direction, and a first upper edge portion and a first lower edge portion separately arranged in a row in the y direction. Further, the first flat plate portion 351 has a first upper surface 351a and a first lower surface 351b arranged in the z direction.

The first right edge portion side of the first flat plate portion 351 is not opposed to the terminal block 710 in the z direction. On the first right edge side of the first flat plate portion 351, seven first through-holes 351c are formed, respectively having opening on both of the first upper surface 351a and the first lower surface 351b. These seven first through-holes 351c are spaced apart in the y direction.

As shown in FIG. 3, the collector terminal 330a of the phase switch module is passed through the first through-hole 351c. The tip of the collector terminal 330a is passed from the opening on the first lower surface 351b side of the first through-hole 351c to the opening on the first upper surface 351a side. The tip of the collector terminal 330a is positioned above the first upper surface 351a in the z direction.

Although not shown, a first connection portion protruding above the first upper surface 351a in the z direction is formed as an annular edge portion of the first through-hole 351c. The first connection portion and the tip end of the collector terminal 330a are joined by laser welding or the like. As a result, the P bus bar 303 is connected to the collector terminals 330a of the seven phase switch modules, respectively.

The first extension portions 352 extend respectively in the x direction and the y direction from the first flat plate portion 351. In the present embodiment, the four first extension portions 352 are integrally connected to the first flat plate portion 351. Two of the four first extension portions 352 extend away from the first left edge of the first flat plate portion 351 in the x direction. The two first extension portions 352 are arranged side by side (i.e., separately) to extend in the y direction, as shown in FIG. 4.

One of the remaining two first extension portions 352 extends away from the first upper edge of the first flat plate portion 351 in the y direction. The last one of the first extension portions 352 extends away from the first lower edge in the y direction. The directions in which the remaining two first extension portions 352 extend away from the first flat plate portion 351 are opposite to each other in the y direction. These remaining two first extension portions 352 are separated/dislocated along the x direction.

Each of the four first extension portions 352 has a first through-hole 352a penetrating in the z direction. The shaft of an embedded bolt 712 of the terminal block 710 is passed through each of the four first through-holes 352a.

The two first extension portions 352 integrally connected to the first left edge of the first flat plate portion 351 are connected to the third electrode bus bar 322 that is connected to one of the two electrodes of the smoothing capacitor 321. At the same time, these two first extension portions 352 are fixed to the terminal block 710. The two first extension portions 352 integrally connected respectively to the first upper edge and the first lower edge of the first flat plate portion 351 are fixed to the terminal block 710.

<N Bus Bar>

Figure 5:
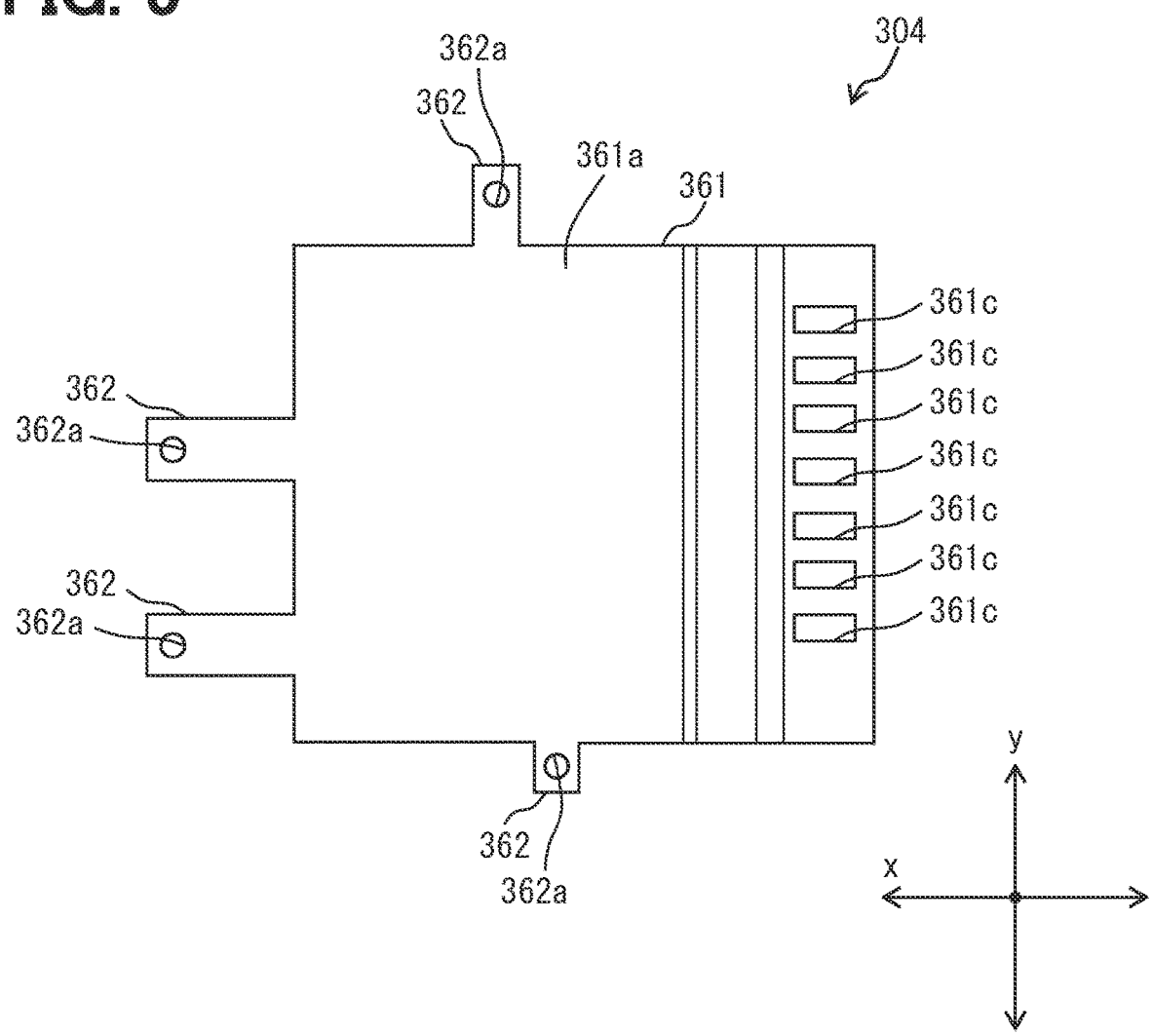
FIG. 5 is a top view of an N bus bar.

As shown in FIG. 5, the N bus bar 304 has a flat plate shape with a small thickness in the z direction. To be more specific, the N bus bar 304 has a second flat plate portion 361 and a second extension portion 362.

The second flat plate portion 361 is larger in size than the second extension portion 362. The center of gravity of the N bus bar 304 is positioned in the second flat plate portion 361. More precisely, the center of gravity of the N bus bar 304 is positioned in part of the second flat plate portion 361 that is aligned with the terminal block 710 in the z direction.

The second flat plate portion 361 has a second left edge portion and a second right edge portion separately arranged in a row in the x direction, and a second upper edge portion and a second lower edge portion separately arranged in a row in the y direction. Further, the second flat plate portion 361 has a second upper surface 361a and a second lower surface 361b arranged in the z direction.

The second right edge side of the second flat plate portion 361 is not opposed to the terminal block 710 in the z direction. On the second right edge side of the second flat plate portion 361, seven second through-holes 361c are formed, respectively having opening on both of the second upper surface 361a and the second lower surface 361b. These seven second through-holes 361c are spaced apart in the y direction.

As shown in FIG. 3, the emitter terminal 330b of the phase switch module is passed through the second through-hole 361c. The tip of the emitter terminal 330b is passed from the opening on the second lower surface 361b side of the second through-hole 361c to the opening on the second upper surface 361a side. The tip of the emitter terminal 330b is positioned above the second upper surface 361a in the z direction.

Although not shown, a second connection portion protruding above the second upper surface 361a in the z direction is formed as an annular edge portion of the second through-hole 361c. The second connection portion and the tip end of the emitter terminal 330b are joined by laser welding or the like. As a result, the N bus bar 304 is connected to the emitter terminals 330b of the seven phase switch modules, respectively.

The second extension portions 362 extend respectively in the x direction and the y direction so as to be separated (i.e., away) from the second flat plate portion 361. In the present embodiment, the four second extension portions 362 are integrally connected to the second flat plate portion 361. Two of the four second extension portions 362 extend in a manner separated (i.e., away) from the second left edge of the second flat plate portion 361 in the x direction. These two second extension portions 362 are arranged side by side in the y direction.

One of the remaining two second extension portions 362 extends in a manner separated (i.e., away) from the second upper edge of the second flat plate portion 361 in the y direction. One last second extension portion 362 extends away from the second lower edge in the y-direction. The directions in which the remaining two second extension portions 362 extend away from the first flat plate portion 351 are opposite to each other in the y direction. These remaining two second extension portions 362 are separated/dislocated in the x direction.

Each of the four second extension portions 362 has a second through-hole 362a penetrating in the z direction. The shaft of the embedded bolt 712 of the terminal block 710 is passed through each of the four second through-holes 362a.

The two second extension portions 362 integrally connected to the second left edge of the second flat plate portion 361 are connected to the fourth electrode bus bar 323 connected to the other of the two electrodes of the smoothing capacitor 321. At the same time, these two second extension portions 362 are fixed to the terminal block 710. Two second extension portions 362 integrally connected to the second upper edge portion and the second lower edge portion of the second flat plate portion 361 are fixed to the terminal block 710.

As shown in FIG. 3, a part of the second flat plate portion 361 closer to the center than the part where the second through-hole 361c is formed is opposed to the P bus bar 303 in the z direction. The opposing part of the second flat plate portion 361 opposing to the P bus bar 303 described above is locally dented in the z direction from the second lower surface 361b toward the second upper surface 361a. By locally providing a dent in the opposing part, contact between (i) the first connection portion of the P bus bar 303 and the tip end of each of the collector terminals 330a and (ii) the N bus bar 304 is avoided.

In FIGS. 2 and 5, lines for indicating the dented portion is shown in the N bus bar 304. However, in FIG. 10, illustration of the lines indicating the dented portion is omitted to avoid complicating the drawing. Alternatively, a different configuration from the above may be employed, in which the second flat plate portion 361 has a through-hole for simply passing the first connection portion and the collector terminal 330a formed therein instead of having a dent locally in the second flat plate portion 361.

<Terminal Block>

Figure 6:
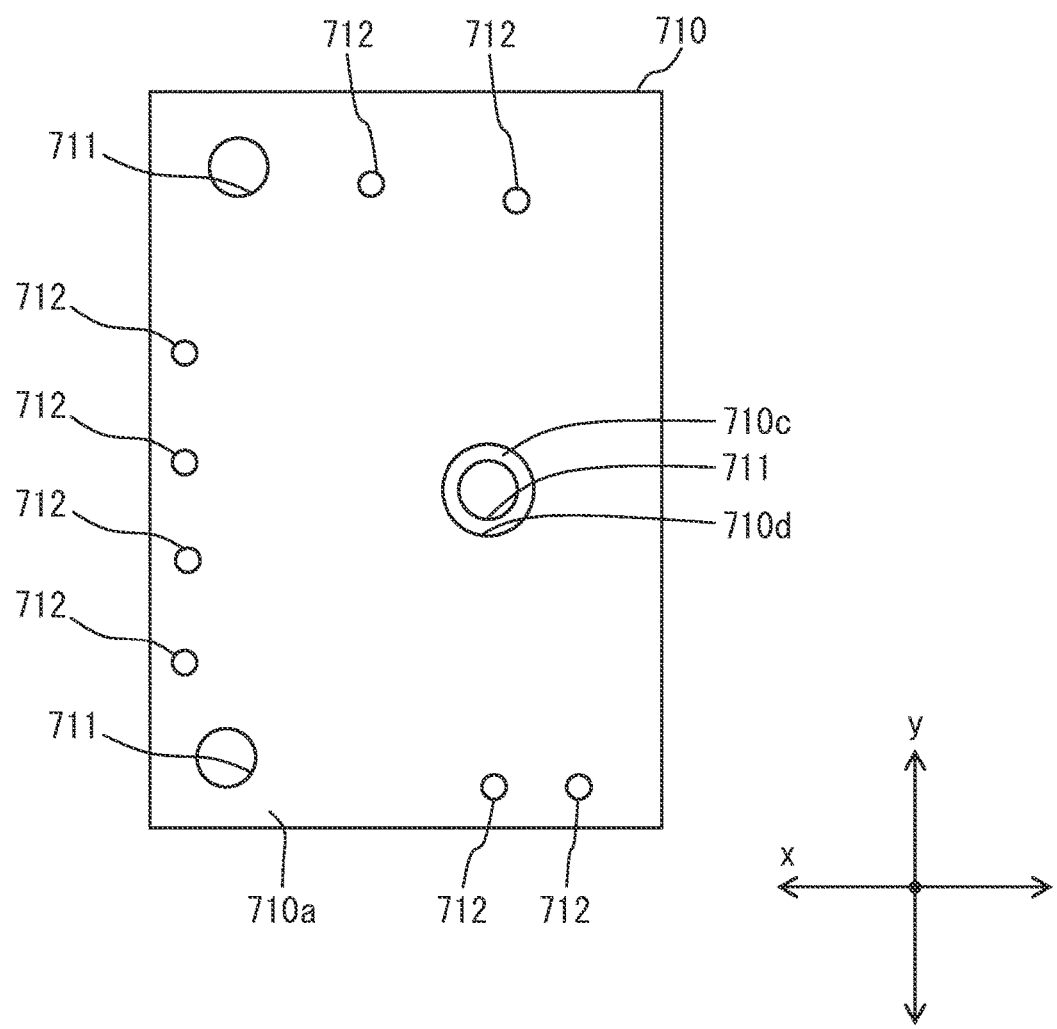
FIG. 6 is a top view of a terminal block.

As shown in FIG. 6, the terminal block 710 is substantially rectangular in a plane facing the z direction. Thus, the terminal block 710 has a left surface and a right surface separated from each other in the x direction, and an upper surface and a lower surface separated from each other in the y direction. The terminal block 710 has a top surface 710a and a bottom surface 710b arranged in the z direction.

The terminal block 710 has three bolt holes 711 formed thereon, which have opening on the top surface 710a and the bottom surface 710b, respectively. The openings on the top surface 710a side of these three bolt holes 711 are put in a triangular positional relationship in which a triangle is formed by three line segments connecting these three openings. The triangle and the center of gravity of the terminal block 710 are arranged along the z direction. In other words, the triangle includes a position of the center of gravity of the terminal block 710 in a view along the z direction.

Two of the three bolt holes 711 are positioned on the left surface side of the terminal block 710 in the x direction. One of these two bolt holes 711 is positioned on the upper surface side in the y direction. The other of the two bolt holes 711 is positioned on the lower surface side in they direction. These two bolt holes 711 are positioned close to an edge (e.g., close to the left edge) of the terminal block 710.

On the other hand, the last one of the three bolt holes 711 is positioned between the left surface and the right surface in the x direction, and is positioned between the upper surface and the lower surface in the y direction. The last one of the three bolt holes 711 is positioned in a center area of the terminal block 710. The formation position of the last one of the three bolt holes 711 is put on a center line, a line piercing a center point CP of the bus bar module 700 extending in the z direction. The center point CP corresponds to the center point of mass (i.e., center of gravity) of the bus bar module 700.

As shown in FIG. 3, the center area of the terminal block 710 is locally concaved from the top surface 710a toward the bottom surface 710b. The concave is defined by a bottom face 710c facing the z direction and an annular face 710d that forms an annular shape circling the z axis representing the z direction. The last one of the three bolt holes 711 is opened in the bottom face 710c. The bottom face 710c corresponds to an arrangement section.

The length of the annular face 710d in the z direction is shorter on the right side than that on the left side. Therefore, a portion of the top surface 710a on the left side of the annular face 710d is further away from the bottom surface 710b in the z direction than a portion on the right side.

The P bus bar 303 is located at a position on the left side of the annular face 710d on the top surface 710a. In this state where the P bus bar 303 is located on the top surface 710a, the bottom face 710c where the bolt hole 711 is opened and the P bus bar 303 are separated by a first height H1 in the z direction. The first height H1 is longer than the axial length of the head 752a of the fixing bolt 752. Therefore, the fixing bolt 752 and the P bus bar 303 face each other while being separated in the z direction. An insulation distance between the head 752a of the fixing bolt 752 and the P bus bar 303 is ensured.

Note that the first height H1 is shorter than an axial length L1 of the fixing bolt 752. The bottom surface 710b and the P bus bar 303 are separated from each other by a second height H2 in the z direction. The second height H2 is also shorter than the axial length L1 of the fixing bolt 752.

A portion of the top surface 710a on the right side of the annular face 710d is opposed to the P bus bar 303 in the z-direction. The left side of the top surface 710a with respect to the annular face 710d and the P bus bar 303 are separated by a third height H3 in the z direction. The third height H3 is shorter than a shortest width W1 of the head 752a of the fixing bolt 752 on a plane orthogonal to the z direction. A direction along a plane orthogonal to the z direction corresponds to a plane direction. A portion on the right side of the annular face 710d in the top surface 710a corresponds to a peripheral portion.

The head of the embedded bolt 712 is insert-molded in the terminal block 710. The shaft of the embedded bolt 712 protrudes above the top surface 710a along the z direction. The shaft of the embedded bolt 712 selectively catches, or pierces, through-holes formed in the extension portion of the P bus bar 303 and the N bus bar 304 and through-holes formed in the third electrode bus bar 322 and the fourth electrode bus bar 323.

Then, a fixing nut 713 shown in FIGS. 2 and 3 is fastened onto the shaft of the embedded bolt 712. Thereby, each of the P bus bar 303, the N bus bar 304, the third electrode bus bar 322, and the fourth electrode bus bar 323 is fixed to the terminal block 710. At the same time, the P bus bar 303 and the third electrode bus bar 322 are electrically connected. The N bus bar 304 and the fourth electrode bus bar 323 are electrically connected.

In the present embodiment, the eight embedded bolts 712 are insert-molded along the edge of the top surface 710a of the terminal block 710. A polygon is formed by eight line segments connecting the shafts of the eight embedded bolts 712 adjacent to each other at the shortest distance on a plane facing the z direction. The polygon and the center point CP of the bus bar module 700 are arranged in the z direction. An overlapping area of the polygon and the above-described triangle in a view along the z direction and the center of gravity of the terminal block 710 are arranged in the z direction.

Four of these eight embedded bolts 712 are positioned on the left side of the terminal block 710. These four embedded bolts 712 are positioned with space reserved therebetween along the y direction. Two of the four embedded bolts 712 arranged along the y direction, e.g., a first one and a third one, catch the first through-hole 352a in the first extension portion 352 of the P bus bar 303 and the through-hole formed in the third electrode bus bar 322. The fixing nut 713 is fastened onto the shaft of the embedded bolt 712. In such manner, the P bus bar 303 and the third electrode bus bar 322 are electrically connected and fixed to the terminal block 710.

Further, the remaining two of the four embedded bolts 712 catch the second through-hole 362a in the second extension portion 362 of the N bus bar 304 and the through-hole formed in the fourth electrode bus bar 323. The fixing nut 713 is fastened onto the shaft of the embedded bolt 712. In such manner, the N bus bar 304 and the fourth electrode bus bar 323 are electrically connected and fixed to the terminal block 710.

Two of the remaining four embedded bolts 712 are positioned in the upper surface of the terminal block 710. These two embedded bolts 712 are arranged side by side in the x direction. The last two embedded bolts 712 are positioned in the lower surface of the terminal block 710. The two embedded bolts 712 in the upper surface and in the lower surface are spaced apart in the x direction.

One of the two embedded bolts 712 arranged along the x direction in the upper surface catches the first through-hole 352a of the first extension portion 352. The remaining one of the two embedded bolts 712 catches the second through-hole 362a in the second extension portion 362. One of the two embedded bolts 712 arranged along the x direction in the lower surface catches the first through-hole 352a. The remaining one of the two embedded bolts 712 catches the second through-hole 362a. The fixing nut 713 is fastened onto each of the shafts of these four embedded bolts 712.

As described above, the P bus bar 303 is fixedly located onto the terminal block 710 at four positions. The N bus bar 304 is also fixedly located onto the terminal block 710 at four points. A polygon formed by four line segments connecting the four embedded bolts 712 for fixing the P bus bar 303 and the center of gravity of the terminal block 710 are arranged (i.e., overlap) in the z direction. Similarly, a polygon formed by four line segments connecting the four embedded bolts 712 for fixing the N bus bar 304 and the center of gravity of the terminal block 710 are also arranged (i.e., overlap) in the z direction. Note that these polygons and the center point CP may be arranged (i.e., overlap) in the z direction.

With the P bus bar 303 and the N bus bar 304 fixed onto the terminal block 710 in such manner, the center point CP of the bus bar module 700 is positioned at, or covered by, the first flat plate portion 351 of the P bus bar 303 and also covered by the second flat plate portion 361 of the N bus bar 304 and also covered by the terminal block 710. A center line passing through the center point CP in the z direction passes/pierces through one of the three bolt holes 711. The head of the fixing bolt 752 passed through the bolt hole 711 pierced by the center line faces the P bus bar 303 in the z direction while being separated therefrom. At the same time, the head of the fixing bolt 752 is aligned with the P bus bar 303 in the z direction and is also aligned with the N bus bar 304 via the insulative paper 720.

<Bus Bar Module Assembly Method>

As shown in FIGS. 3 and 7, first, the terminal block 710 is located on the housing 750 such that the bottom surface 710b faces the housing 750. A part of the bottom surface 710b is brought into contact with the support surface 751a of the support portion 751 shown in FIG. 3. When bringing the terminal block 710 into contact with the housing 750, the bolt hole 711 formed in the terminal block 710 and the fixing bolt hole 751b formed in the housing 750 are aligned in the z direction. Then, the shaft of the fixing bolt 752 is inserted from the opening on the top surface 710a side of the bolt hole 711. The tip end side of the shaft of the fixing bolt 752 is fastened to the thread groove of the fixing bolt hole 751b. The terminal block 710 is held in a binding manner at a position between the head of the fixing bolt 752 and the support portion 751 of the housing 750. Thus, the terminal block 710 is fixedly located onto the housing 750.

Although not shown in FIGS. 7 to 10, before the bus bar module 700 is fixed to the housing 750, the cooler 730 containing the seven phase switch modules is fixed to the housing 750 by a spring body. Further, the fixing nut 713 is not shown in FIGS. 7 to 10 in terms of the illustration of how to fixedly dispose the terminal block 710, for the explanation of arrangement of various other components.

After fixing the terminal block 710 onto the housing 750 in such manner, the P bus bar 303 is located onto the terminal block 710 such that the first lower surface 351b faces the top surface 710a of the terminal block 710 in the z direction as shown in FIG. 8. When disposing the P bus bar onto the terminal block 710, the shaft of the embedded bolt 712 is passed through each of the first through-holes 352a formed in the four first extension portions 352 of the P bus bar 303. Thus, the position of the P bus bar 303 with respect to the terminal block 710 is determined.

Due to such positioning, the head 752a of the fixing bolt 752, which has the shaft thereof passed through the bolt hole 711 opened in the bottom face 710c locally concaved in the terminal block 710, and the P bus bar 303 face each other while being separated with distance in the z direction. The collector terminals 330a of the seven phase switch modules pass through the seven first through-holes 351c formed in the first flat plate portion 351 of the P bus bar 303, respectively.

Thereafter, as shown in FIGS. 2 and 3, the shaft of the embedded bolt 712 catches the through-hole of the third electrode bus bar 322, and the bus bar 322 is fixedly fastened onto the shaft of four embedded bolts 712 respectively provided in the first extension portion 352 by the fixing nut 713. Then, the first connection portion of the first flat plate portion 351 and the collector terminal 330a are joined by laser.

Next, as shown in FIG. 9, the insulative paper 720 is located at the center of the first flat plate portion 351 of the P bus bar 303.

Then, as shown in FIG. 10, the N bus bar 304 is located onto the insulative paper 720 so that the second lower surface 361b faces the insulative paper 720 in the z direction. When disposing the N bus bar 304, the shaft of the embedded bolt 712 passes through each of the second through-holes 362a formed in the four second extension portions 362 of the N bus bar 304. Thus, the position of the N bus bar 304 with respect to the terminal block 710 is determined.

By such positioning, (i) the N bus bar 304 and (ii) the head 752a of the fixing bolt 752 whose shaft passes through the bolt hole 711 that opens in the bottom face 710c of the locally concaved portion of the terminal block 710 face each other in the z direction via the insulative paper 720 and the P bus bar 303. The emitter terminals 330b of the seven phase switch modules pass through the seven second through-holes 361c formed in the second flat plate portion 361 of the N bus bar 304, respectively.

Thereafter, as shown in FIGS. 2 and 3, the shaft of the embedded bolt 712 catches the through-hole of the fourth electrode bus bar 323, and the fourth electrode bus bar is fixedly fastened onto the shaft of the four embedded bolts 712 in the second extension portion 362 by the fixing nut 713, respectively. Then, the second connection portion of the second flat plate portion 361 and the emitter terminal 330b are joined by laser. The bus bar module 700 is fixed to the housing 750 by the steps described above. At the same time, the bus bar module 700 is electrically connected to each of the third electrode bus bar 322 and the fourth electrode bus bar 323.

<Operation and Effects>

The bus bar module 700 has a conductive P bus bar 303 and N bus bar 304 connected to switches in the seven phase switch modules, and an insulative terminal block 710 on which the P bus bar 303 and N bus bar 304 are located.

The terminal block 710 is fixed to the housing 750 via the three conductive fixing bolts 752. The head of one of these three fixing bolts 752 and the P bus bar 303 face each other while being separated with distance in the z direction along which the shaft of the fixing bolt 752 extends. The N bus bar 304 is aligned with the head of the fixing bolt 752 while being separated with distance in the z direction.

Due to such a configuration, an electric current according to control of the switch in the phase switch module flows through the P bus bar 303 and the N bus bar 304. As a result, electric energy corresponding to the inductance component of the P bus bar 303 and the N bus bar 304 is stored in the P bus bar 303 and the N bus bar 304, respectively.

However, the magnetic field generated by the electric current flowing through the P bus bar 303 and the N bus bar 304 easily passes through the fixing bolts 752 arranged close to the bus bars in the z direction. That is, an eddy current may easily flow through the fixing bolt 752.

Therefore, electric energy is hardly stored in the inductance component of the P bus bar 303 and the N bus bar 304. That is, in other words, the inductance component of the P bus bar 303 and the N bus bar 304 may easily be reducible. As a result, an increase in surge voltage caused by a temporal change in the electric current flowing through the P bus bar 303 and the N bus bar 304 is easily suppressible.

The bolt hole 711 of the terminal block 710 into which the shaft of the fixing bolt 752 facing the P bus bar 303 in the z direction is inserted is formed at a position of the center point CP of the bus bar module 700, i.e., an orthogonal line piercing the center point CP extends in the z direction to also pierce the bold hole 711.

According to such a configuration, for example, compared to a configuration in which the bolt hole 711 is formed at a position close to an edge that does not oppose to at least one of the flat plate portions of the P bus bar 303 and the N bus bar 304 of the terminal block 710 in the z-direction, the deterioration of anti-vibration is suppressed (i.e., vibration-proof). Therefore, the occurrence of stress is suppressed at the connection portion between the P bus bar 303 and the collector terminal 330a and the connection portion between the N bus bar 304 and the emitter terminal 330b. Also, the deterioration in the electrical connection reliability between the P bus bar 303 and the N bus bar 304 and the switches in the phase switch module is suppressed.

The bolt hole 711 into which the shaft of the fixing bolt 752 facing the P bus bar 303 in the z direction is inserted is formed at a concave position of the terminal block 710 where a local concave is formed from the top surface 710a to the bottom surface 710b. The bolt hole 711 is opened in the bottom face 710c facing the z direction, which defines a part of the concave. The distance (i.e., the first height H1) in the z direction between the P bus bar 303 and the bottom face 710c where the bolt hole 711 opens is longer than the length of the head of the fixing bolt 752 in the z direction.

According to such configuration, compared to a configuration in which each of the P bus bar 303 and the N bus bar 304 is deformed so as to avoid contact with the head of the fixing bolt 752, an increase in the physical size of these bus bars is suppressed. At the same time, an increase in the length of the power supply path between the switches in the phase switch modules in the P bus bar 303 and the N bus bar 304 and the smoothing capacitor 321 is suppressed. Further, an increase in the length of the power supply path is suppressed as compared with a configuration in which notches for avoiding contact with the head of the fixing bolt 752 are formed in the P bus bar 303 and the N bus bar 304. As a result, an increase in the inductance component of the power supply path between the switches via the P bus bar 303 and the N bus bar 304 and the smoothing capacitor 321 is suppressed. Thus, an increase in surge voltage is suppressed.

The right side of the top surface 710a with respect to the annular face 710d is separated from the P bus bar 303 by the third height H3 in the z direction. The third height H3 is shorter than the shortest width W1 on a plane orthogonal to the axial direction of the head of the fixing bolt 752. The shortest width corresponds to the shortest length.

According to such configuration, the fixing bolt 752 is suppressed from being separated from (i.e., escaping from) the local concave of the terminal block 710 via the gap between the terminal block 710 and the P bus bar 303. That is, in other words, a formation of an unintended power supply path via the fixing bolt 752 that has come off from the bolt hole 711 is suppressed. Namely, occurrence of a short circuit due to the fixing bolt 752 is suppressed.

The distance (i.e., the first height H1) between the P bus bar 303 and the bottom face 710c in the z direction is shorter than the axial length L1 of the fixing bolt 752.

According to such configuration, even when the fixing bolt 752 is partially coming off from the bolt hole 711 on the bottom face 710c due to vibration or the like, the head of the fixing bolt 752 contacts, or abuts to, the P bus bar 303 before the shaft of the fixing bolt 752 comes off completely from the bolt hole 711. Thus, the fixing bolt 752 is prevented from coming out of and falling off from the bolt hole 711.

Further, the distance (i.e., the second height H2) between the bottom surface 710b and the P bus bar 303 in the z direction is shorter than the axial length L1 of the fixing bolt 752.

According to such configuration, even when the fixing bolt 752 is partially coming off from the fixing bolt hole 751b of the housing 750 due to vibration or the like, before the shaft of the fixing bolt 752 comes off completely from the fixing bolt hole 751b, the head the fixing bolt 752 contacts the P bus bar 303. Thus, the P bus bar 303 and the housing 750 are electrically connected via the fixing bolt 752.

When the in-vehicle system 100 according to the present embodiment is provided with an electric leakage detection system, conduction between the P bus bar 303 and the housing 750 via the fixing bolt 752 is determined/detected by such electric leakage detection system. By the detection of such conduction, loosening of the fixing bolt 752 is determinable.

Although the present disclosure is described with reference to the preferred embodiment, the present disclosure is not limited to the above-described embodiment but may be implemented with various modifications without departing from the spirit of the present disclosure.

(First Modification)

In the present embodiment, an example in which three bolt holes 711 are formed in the terminal block 710 has been described. However, four or more bolt holes 711 may be formed in the terminal block 710.

In the present embodiment, an example in which one bolt hole 711 is positioned in the center area of the terminal block 710 has been described. However, two or more bolt holes 711 may be positioned in the center area of the terminal block 710. In such modification, the heads of two or more fixing bolts 752 may be arranged to face the P bus bar 303 in the z direction.

In the present embodiment, an example is shown in which one of the plurality of bolt holes 711 is formed at a position of the center point CP of the bus bar module 700 in the terminal block 710 in the z direction. In such an example, the fixing bolt 752 located in the bolt hole 711 is arranged to face the P bus bar 303 in the z direction.

However, the position where the bolt hole 711 is formed is not limited to the above example. The bolt hole 711 may be formed in an area facing at least one of the flat plate portions of the P bus bar 303 and the N bus bar 304 in the center area side of the terminal block 710.

The center area of the terminal block 710 indicates, for example, an area that extends from the center point CP of the terminal block 710 to a position just behind four edges of the terminal block 710. The position just behind the four edges may more practically be a position away from the center point CP by about a quarter of the dimension/length of the terminal block 710 in the z direction. It should be noted that the position about one-quarter away from the center point CP is only a guide, and may also be a position about one-fifth away from the center point CP, for example.

(Second Modification)

In the present embodiment, an example is shown in which the P bus bar 303 faces the head of the fixing bolt 752 while being spaced apart with distance in the z direction, and the N bus bar 304 is spaced apart with distance from the head of the fixing bolt 752 in the z direction. However, any configuration may be adoptable as long as at least one of the P bus bar 303 and the N bus bar 304 is arranged to face the fixing bolt 752 in the z direction. For example, in the configuration shown in FIG. 2, an additional configuration may be employable, in which local holes is formed in each of the P bus bar 303 and the insulative paper 720, so that the N bus bar 304 and the head of the fixing bolt 752 are separated with distance in the z direction through those holes while facing each other.

(Third Modification)

In the present embodiment, an example is shown in which the P bus bar 303, the insulative paper 720, and the N bus bar 304 are stacked on the terminal block 710 in this order. However, conversely, a configuration in which the N bus bar 304, the insulative paper 720, and the P bus bar 303 are stacked on the terminal block 710 in this order can be adopted.

(Fourth Modification)

Figure 11:
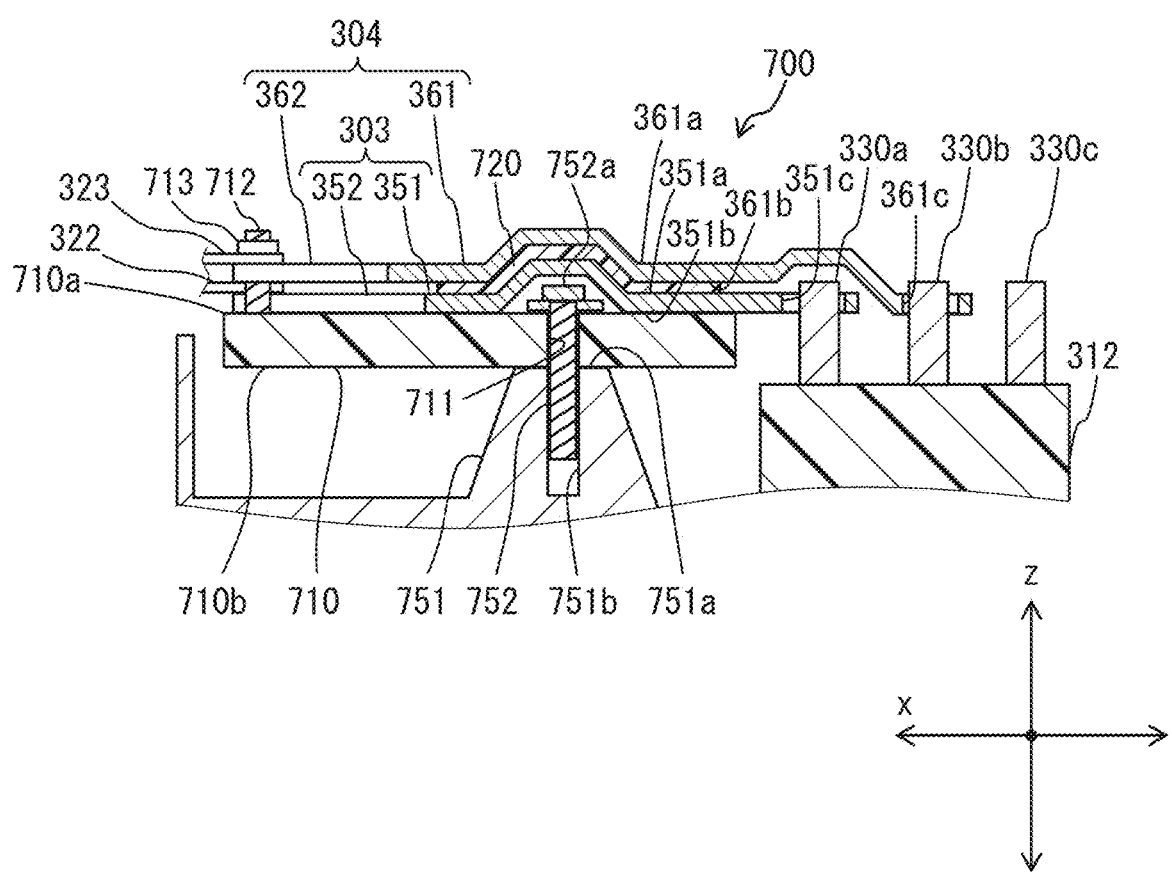
FIG. 11 is a cross-sectional view of a modified example of the bus bar module.

In the present embodiment, an example has been described in which the center portion of the terminal block 710 is locally concaved. However, for example, as shown in FIG. 11, it is also possible to adopt a configuration in which a portion of both of the P bus bar 303 and the N bus bar 304 that are aligned with the fixing bolt 752 in the z direction is locally depressed so as to be separated from the terminal block 710 in the z direction. The locally depressed portion is separated from the portion of the terminal block 710 where the bolt hole 711 is formed at least to such an extent that contact with the head 752a of the fixing bolt 752 is avoided.

(Fifth Modification)

In the present embodiment, an example is shown in which the length in the z direction of the annular face 710d that defines a part of the concave formed in the terminal block 710 is shorter on the right side than on the left side. However, the length of the annular face 710d in the z direction may be the same over the entire circumference. The distance between the bottom surface 710b and a portion of the top surface 710a on the left side of the concave may be equal to the distance between the bottom surface 710b and a portion of the top surface 710a on the right side of concave.

(Sixth Modification)

In the present embodiment, an example in which the head of the embedded bolt 712 is insert-molded in the terminal block 710 has been described. Alternatively, a configuration in which a bolt hole provided with a screw groove for fixing a bolt to the terminal block 710 may be employed.

(Other Modifications)

In the present embodiment, an example has been described in which the power conversion device 300 including the bus bar module 700 is applied to the in-vehicle system 100 configuring a hybrid system. However, the application of the power conversion device 300 is not particularly limited to the above example. For example, a configuration in which the power conversion device 300 is applied to an in-vehicle system of an electric vehicle may be employable.

In the present embodiment, an example has been described in which the inverter 320 has six modules, i.e., the U-phase switch modules 324 to the Z-phase switch modules 329. However, a configuration in which the inverter 320 has three modules, the U-phase switch module 324 to the W-phase switch module 326 can also be adopted.

In the present embodiment, an example has been described in which the power conversion device 300 includes the converter 310 and the inverter 320. However, the power conversion device 300 may include only the inverter 320. In case of such configuration, the positive bus bar 301 is connected to the P bus bar 303. The negative bus bar 302 is connected to the N bus bar 304.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A power conversion circuit energization unit comprising:
   a bus bar module including
      a bus bar that is conductive and connected to a switch element that is included in a power conversion device, and
      a terminal block that is insulative and on which the bus bar is mounted; and
   a fixing bolt that is conductive and fixes the terminal block to a housing in which the switch element is housed, the fixing bolt including a shaft that extends in an axial direction and a head that is attached to an end of the shaft, the head of the fixing bolt having a bottom surface that faces toward the shaft and a top surface that faces away from the shaft in an opposite direction of the bottom surface of the head, wherein
   the top surface of the head of the fixing bolt and the bus bar oppose and face each other and are separated from each other by a predetermined insulation distance in the axial direction along which the shaft of the fixing bolt extends,
   a portion of the terminal block to which the fixing bolt is fixed is interposed between the bottom surface of the head of the fixing bolt and the housing, and
   the head of the fixing bolt is located between the bus bar and the portion of the terminal block to which the fixing bolt is fixed in the axial direction.

2. The power conversion circuit energization unit according to claim 1, wherein
   the terminal block has a bolt hole that opens in a top surface of the terminal block on a side of the terminal block that faces toward the bus bar and opens in a bottom surface of the terminal block on a side of the terminal block that faces toward the housing,
   the shaft of the fixing bolt is inserted into the bolt hole,
   the housing has a fixing bolt hole that opens in a support surface of the housing,
   the support surface of the housing is aligned with the bottom surface of the terminal block in the axial direction, and
   the shaft of the fixing bolt is inserted into the fixing bolt hole of the housing.

3. The power conversion circuit energization unit according to claim 2, wherein
   the bolt hole is formed in a center area of the terminal block, and
   the center area includes a center of gravity of the bus bar module.

4. The power conversion circuit energization unit according to claim 2, wherein
   the top surface of the terminal block has an arrangement section in which the head of the fixing bolt is located, and
   the arrangement section is locally concave in the axial direction, so that the arrangement section is separated from the bus bar by a distance that is greater than an axial length of the head of the fixing bolt in the axial direction.

5. The power conversion circuit energization unit according to claim 2, wherein
   the top surface of the terminal block has an arrangement section in which the head of the fixing bolt is located,
   the terminal block has a peripheral portion that is separated from the arrangement section along a plane direction that is orthogonal to the axial direction,
   the bus bar and the peripheral portion are separated from each other by a distance in the axial direction, and
   the distance is equal to or less than a shortest length of the head of the fixing bolt in the plane direction.

6. The power conversion circuit energization unit according to claim 2, wherein
the bus bar has an opposing part that opposes the head of the fixing bolt in the axial direction, and
the opposing part is locally dented, so that the opposing part is separated from the head of the fixing bolt in the axial direction by a distance that is greater than an axial length of the head of the fixing bolt in the axial direction.

7. The power conversion circuit energization unit according to claim 2, wherein
the bus bar has an opposing part that opposes the head of the fixing bolt in the axial direction,
the top surface of the terminal block has an arrangement section in which the head of the fixing bolt is located, and
the opposing part and the arrangement section are separated from each other in the axial direction by a distance that is less than a length of the fixing bolt in the axial direction.

8. The power conversion circuit energization unit according to claim 2, wherein
the bus bar has an opposing part that opposes the head of the fixing bolt in the axial direction, and
the opposing part and the support surface of the housing are separated from each other in the axial direction by a distance that is less than a length of the fixing bolt in the axial direction.

9. The power conversion circuit energization unit according to claim 8, wherein
the power conversion circuit energization unit is connected to an electric leakage detection system,
the housing has a conductivity, and
the electric leakage detection system is configured to determine conduction between the housing and the bus bar.

10. A power conversion circuit energization unit comprising:
a bus bar module including
a bus bar that is conductive and connected to a switch element that is included in a power conversion device, and
a terminal block that is insulative and on which the bus bar is mounted; and
a fixing bolt that is conductive and fixes the terminal block to a housing in which the switch element is housed, wherein
a head of the fixing bolt and the bus bar face each other and are separated from each other by a predetermined insulation distance in an axial direction along which a shaft of the fixing bolt extends,
the terminal block is interposed between the head of the fixing bolt and the housing, and
the bus bar is located on an opposite side of the housing with respect to the head of the fixing bolt.

11. The power conversion circuit energization unit according to claim 10, wherein
the terminal block has a bolt hole that opens in a top surface of the terminal block on a side of the terminal block that faces toward the bus bar and opens in a bottom surface of the terminal block on a side of the terminal block that faces toward the housing,
the shaft of the fixing bolt is inserted into the bolt hole,
the housing has a fixing bolt hole that opens in a support surface of the housing,
the support surface of the housing is aligned with the bottom surface of the terminal block in the axial direction, and
the shaft of the fixing bolt is inserted into the fixing bolt hole of the housing.

12. The power conversion circuit energization unit according to claim 11, wherein
the bolt hole is formed in a center area of the terminal block, and
the center area includes a center of gravity of the bus bar module.

13. The power conversion circuit energization unit according to claim 11, wherein
the top surface of the terminal block has an arrangement section in which the head of the fixing bolt is located, and
the arrangement section is locally concave in the axial direction, so that the arrangement section is separated from the bus bar by a distance that is greater than an axial length of the head of the fixing bolt in the axial direction.

14. The power conversion circuit energization unit according to claim 11, wherein
the top surface of the terminal block has an arrangement section in which the head of the fixing bolt is located,
the terminal block has a peripheral portion that is separated from the arrangement section along a plane direction that is orthogonal to the axial direction,
the bus bar and the peripheral portion are separated from each other by a distance in the axial direction, and
the distance is equal to or less than a shortest length of the head of the fixing bolt in the plane direction.

15. The power conversion circuit energization unit according to claim 11, wherein
the bus bar has an opposing part that opposes the head of the fixing bolt in the axial direction, and
the opposing part is locally dented, so that the opposing part is separated from the head of the fixing bolt in the axial direction by a distance that is greater than an axial length of the head of the fixing bolt in the axial direction.

16. The power conversion circuit energization unit according to claim 11, wherein
the bus bar has an opposing part that opposes the head of the fixing bolt in the axial direction,
the top surface of the terminal block has an arrangement section in which the head of the fixing bolt is located, and
the opposing part and the arrangement section are separated from each other in the axial direction by a distance that is less than a length of the fixing bolt in the axial direction.

17. The power conversion circuit energization unit according to claim 11, wherein
the bus bar has an opposing part that opposes the head of the fixing bolt in the axial direction, and
the opposing part and the support surface of the housing are separated from each other in the axial direction by a distance that is less than a length of the fixing bolt in the axial direction.

18. The power conversion circuit energization unit according to claim 17, wherein
- the power conversion circuit energization unit is connected to an electric leakage detection system,
- the housing has a conductivity, and
- the electric leakage detection system is configured to determine conduction between the housing and the bus bar.

* * * * *